United States Patent
Bell et al.

[11] 3,761,476
[45] Sept. 25, 1973

[54] METHOD OF PREPARATION OF QUINAZOLINE COMPOUNDS

[75] Inventors: Stanley C. Bell, Penn Valley; George L. Conklin, Havertown, both of Pa.

[73] Assignee: American Home Products Corporation, New York, N.Y.

[22] Filed: Nov. 20, 1970

[21] Appl. No.: 91,602

Related U.S. Application Data

[60] Continuation-in-part of Ser. No. 786,404, Dec. 23, 1968, abandoned, which is a division of Ser. No. 457,158, May 19, 1965, Pat. No. 3,452,041.

[52] U.S. Cl. ............................................ 260/251 QB
[51] Int. Cl. .............................................. C07d 51/48
[58] Field of Search ....................... 260/251 QB, 260

[56] References Cited
UNITED STATES PATENTS
3,452,041  6/1969  Bell et al.......................... 260/309.5

*Primary Examiner*—Alex Mazel
*Assistant Examiner*—R. V. Rush
*Attorney*—Vito Victor Bellino, Andrew Kafko, Joseph Martin Weigman, Dwight J. Potter and Robert Wiser

[57] ABSTRACT

The disclosure is directed to a method of preparing quinazolinone compounds having the formula

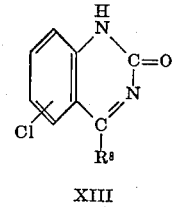

XIII by treating with base a compound having the formula

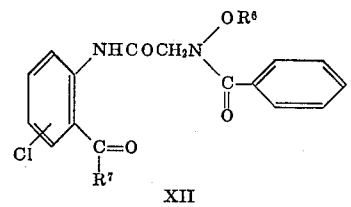

XII where $R^6$, $R^7$ and $R^8$ are as described below, followed by cooling, and acidifying the reaction mass.

1 Claim, No Drawings

METHOD OF PREPARATION OF QUINAZOLINE COMPOUNDS

This application is a continuation-in-part of U.S. Pat. application Ser. No. 786,404 filed Dec. 23, 1968 now abandoned which was in turn a division of U.S. Pat. application Ser. No. 457,158, filed May 19, 1965 now U.S. Pat. No. 3,452,041.

This invention is directed to novel imidazole compounds to intermediates arising in their synthesis, to derivatives thereof, and to an advantageous process for making quinazolone compounds and 3-hydroxy hydantoic acids. The compounds of the invention are obtained by subjecting the reaction product of a hydroxyaminoacetanilide or of 2'-benzoyl-2-hydroxyaminoacetanilide and phenylchloroformate to various reactions.

As determined by standard experimental procedures using warm-blooded animals, the compounds of this invention exhibit anticonvulsant activity.

The main reactions occurring in the preparation of the herein disclosed compounds are summarized below first with respect to the products obtained by further treatment of the reaction product of phenyl chloroformate and 2-hydroxyaminoacetanilide; more specifically, 4'-chloro-2-hydroxyaminoacetanilide:

nyl ester (III). Treatment of the latter compound with an acyl anhydride such as acetic anhydride and heat yields the corresponding 2-[carboxy(hydroxy)amino]-4'-chloroacetanilide, phenyl ester, acetate (IV). Refluxing the latter compound in ethanol yields the 3-(p-chlorophenyl)-1-hydroxy hydantoin, acetate (V). On the other hand, gentle warming of compound (III) in ethanol with dilute base followed by acidification with dilute mineral acid yields 5-(p-chlorophenyl)-3-hydroxy hydantoic acid (VI).

Treatment of compound (V) with ammonia in alcohol and heating yields the corresponding acid amide (VII). The same result can be achieved by using an alkyl or arylamine instead of ammonia. Treatment of compound (V) with hydrazine yields a 3-hydroxyhydantoic acid hydrazide (Va). Treatment of compound (V) with an amino-benzenesulfonamide in presence of a tertiary amine produces a 5-sulfamylanilino hydantoin.

Treatment of compound (V) with a dialkyl amine in ethanol causes the removal of the acetate function in the 1-position and formation of the corresponding 5-dialkylamino compound (VIII). Corresponding 5-alkoxy and 5-mercapto compounds having substantially the same properties are obtained by using an alk-

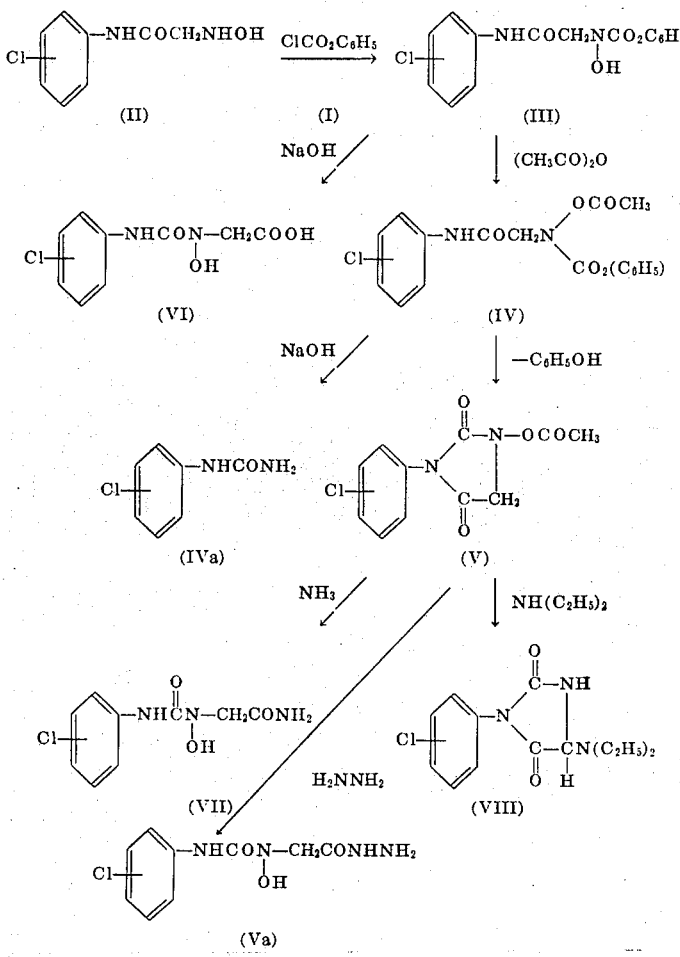

Referring now to the flow diagram, it will be seen that refluxing phenylchloroformate (I) and 4'-chloro-2-hydroxyaminoacetanilide (II) in chloroform, removing the solvent in vacuo, and adding ethanol to the residue, results in the formation of the corresponding 2-[carboxy(hydroxy)amino]-4'-chloroacetanilide, pheoxide and a mercaptan, respectively, instead of the dialkylamine.

The products obtained by the further treatment of the reaction product of phenylchloroformate and 2'-benzoyl-4'-chloro-2-hydroxyaminoacetanilide are shown by way of illustration in the following reaction scheme:

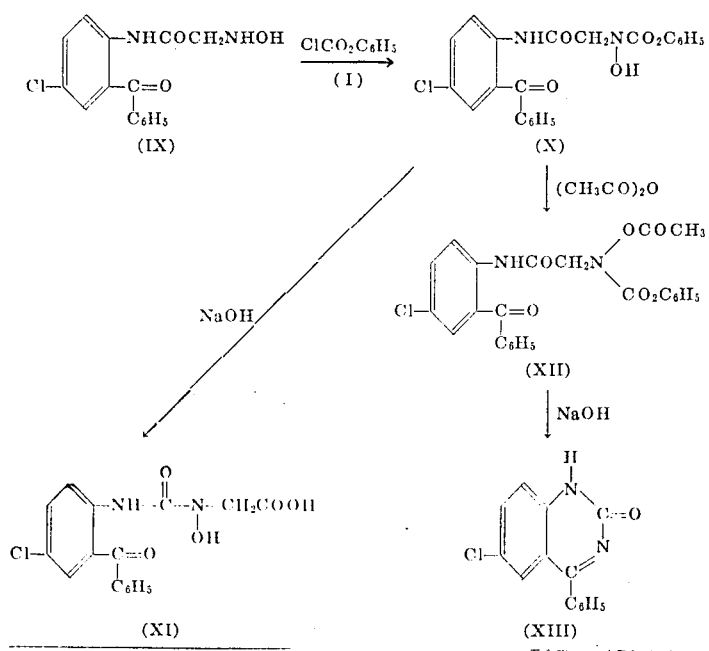

As shown above, refluxing phenylchloroformate (I) in chloroform with 2'-benzoyl-4'-chloro-2-hydroxy aminoacetanilide (IX) removing the solvent in vacuo and adding ethanol to the residue causes 2-[carboxy(hydroxy)amino]-2'-benzoyl-4'-chloroacetanilide, phenyl ester (X) to precipitate. Gently warming this compound in ethanol with dilute base, acidifying the reaction mixture with dilute mineral acid and heating yields the corresponding 5-[2-benzoyl-4-chlorophenyl]-3-hydroxy hydantoic acid (XI).

Compound (X) can be acylated with an acyl anhydride, such as acetic anhydride to form the corresponding acylate (XII).

As previously suggested, the present invention provides an advantageous process for making quinazolines. This feature of the invention can be appreciated from the fact that heating a 2-[carboxy(hydroxy)amino]-2'-benzoyl-4'-chloroacetanilide, acetate, phenyl ester, compound (XII) in an inert solvent such as alcohol, with excess base such as sodium hydroxide followed by acidification of the cooled solution with acid affords the known compound, 6-chloro-4-phenyl-quinazolin-2(1H)-one (XIII).

In the treatment of compound (IV) with base a phenyl urea (IVa) is obtained. If this urea has a benzoyl group in the 2'-position as in compound (XII) the resulting urea will ring close to form a quinazolone. Where compound (XII) has a carbethoxy group in the 2'-position instead of a benzoyl group the resulting product will be a quinazolinedione. Where compound (XII) has an acyl group in the 2'-position instead of a benzoyl group the resulting product will be a 4-alkylquinazolin-2(1H)-one.

The novel products obtained by the reactions illustrated in the foregoing reaction schemes can be characterized by the following formulae:

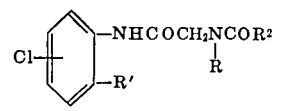

and

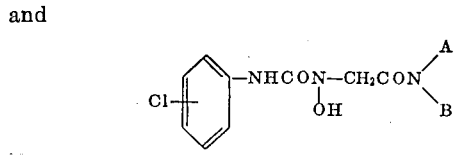

wherein A and B are (lower)alkylaminoalkyl, amino or hydrogen, and A and B taken together with the nitrogen atom represent a 1-pyrrolidinyl ring, R is hydroxy or acetoxy, R' is hydrogen or benzoyl, $R^2$ is phenoxy and:

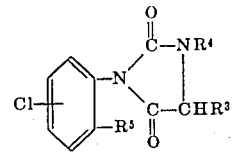

where $R^3$ is hydrogen, 2-sulfamylanilino or diethylamino, $R^4$ is acetoxy or hydrogen, $R^5$ is hydrogen; with the proviso that when $R^3$ is diethylamino or 2-sulfamylanilino, $R^4$ is hydrogen and when $R^3$ is hydrogen then $R^4$ is acetoxy.

For the purposes of this invention, it should be noted that equivalent substituents for the chlorine atom in the above formulae include the other halogens, as well as hydrogen, alkoxy, halo (lower) alkyl groups such as trifluoromethyl, cyano, alkyl groups having up to five carbon atoms, sulfamyl and substituted sulfamyl groups, benzoyl, carbethoxy, carboxy and the nitro group. It sh- Elemental analysis confirmed the empirical formula:

$C_{17}H_{15}ClN_2O_5$.

EXAMPLE 7

3-(p-chlorophenyl)-1-hydroxyhydantoin, acetate

A solution of 4.5 g. of 2-[carboxy(hydroxy)amino]-4'-chloro-acetanilide, phenyl ester, acetate was refluxed in 20 ml. of ethanol for 15 minutes. Upon cooling there precipitated out 2.3 g. of product, m.p. 116°–118° C.

Elemental analysis confirmed the empirical formula:

$C_{11}H_9ClN_2O_4$.

EXAMPLE 8

3-(p-Chlorophenyl)-5-diethylaminohydantoin

A mixture of 1.0 g. of 3-(p-chlorophenyl)-1-hydroxy hydantoin, acetate in 10 ml. of ethanol was treated with 2.0 ml. of diethylamine. The reaction was exothermic and the resultant solution became warm and was then diluted with water and chilled. The precipitate was filtered and washed with water and acetonitrile giving 1.0 g. of product, m.p. 156°–158° C.

Elemental analysis confirmed the empirical formula:

$C_{13}H_{16}ClN_3O_2$.

EXAMPLE 9

Reactions of 2-[Carboxy(hydroxy)amino]-2'-benzoyl-4'-chloroacetanilide, acetate, phenyl ester

Sodium Hydroxide

To a suspension of the title compound in alcohol was added excess sodium hydroxide solution and the resultant red solution heated to boiling. The solution was cooled, diluted with water, filtered from impurities and acidified with acetic acid giving 6-chloro-4-phenyl-quinazoline-2-(1H)-one m.p. >300° C.

Ammonium Hydroxide

When dissolved in ammonium hydroxide-dimethoxyethane solution at room temperature for 1 hour the title compound gave 6-chloro-4-phenylquinazoline-2(1H)-one and 5-[2-benzoyl-4-chlorophenyl]3-hydroxyhydantoic acid, the compound of Example 2.

EXAMPLE 10

5-(p-chlorophenyl)-3-hydroxyhydantoic acid amide

A mixture of 1.0 g. of 3-(p-chlorophenyl)-1-hydroxyhydantoin, acetate, alcohol and ammonium hydroxide was warmed for several minutes, diluted with water and concentrated to a small volume. The resultant precipitate was collected and recrystallized from acetonitrile giving the product, m.p. 161°–163° C.

Elemental analysis confirmed the empirical formula:

$C_9H_{10}ClN_3O_3$.

EXAMPLE 11

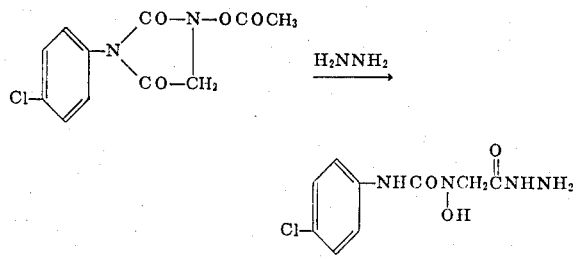

5-(p-chlorophenyl)-3-hydroxyhydantoic acid hydrazide, m.p. 155°–157° C.

was prepared from 1.0 g. of 3-(p-chlorophenyl)-1-hydroxyhydantoin, acetate, 5 ml. of alcohol and 2 ml. of hydrazine according to the procedure of Ex. 10.

Elemental analysis confirmed the empirical formula:

$C_9H_{11}ClN_4O_3$.

EXAMPLE 12

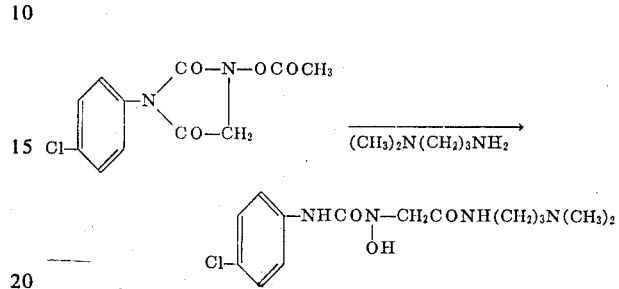

5-(p-chlorophenyl)-N-[3-(dimethylaminopropyl)]3-hydroxyhydantamide

To a solution of 5 ml. of 3-dimethylaminopropylamine and 40 ml. of ethanol was added 2.0 g. of 3-(p-chlorophenyl)-1-hydroxyhydantoin, acetate. The slightly exothermic reaction was allowed to stand for 10 minutes and the solvent was removed in vacuo. The solid was recrystallized from benzene and then acetonitrile yielding 1.0 g. of product, m.p. 133°–135° C.

Elemental anaylsis confirmed the empirical formula:

$C_{14}H_{21}ClN_4O_3$.

EXAMPLE 13

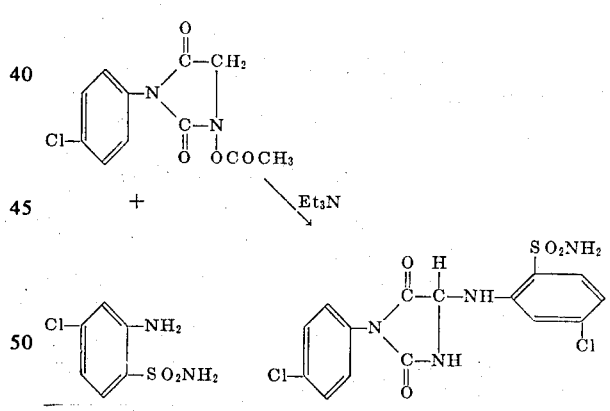

3-(p-chlorophenyl)-5-(5-chloro-2-sulfamylanilino)hydantoin

To a mixture of 2.0 g. of 3-(p-chlorophenyl)-1-hydroxyhydantoin, acetate, 2.0 g. of 2-amino-4-chlorobenzene-sulfonamide and alcohol was added with stirring a solution of 1 ml. of triethylamine in alcohol. The slightly exothermic reaction was allowed to stand for 10 minutes and concentrated to dryness in vacuo. The residue was dissolved in ether, washed with water and concentrated to dryness. After recrystallization from benzene and then acetonitrile the product had a m.p. of 240°–243° C.

Elemental analysis confirmed the empirical formula:

$C_{15}H_{12}Cl_2N_4O_4S$.

ould similarly be noted that more than one such substituent can be present on the phenyl ring. Compounds bearing the above-mentioned substituents possess substantially the same properties as those specifically claimed herein.

It should also be noted that replacement of the hydroxy or acetoxy substituent R by an acyloxy group having up to nine carbon atoms therein does not in any way affect the activity of the compounds so substituted.

Similarly, replacement of the substituent R' and R⁵ by benzoyl and substituted benzoyl groups such as p-chlorobenzoyl, p-bromobenzoyl, o-alkoxybenzoyl, halo(alkyl)benzoyl, alkylbenzoyl, alkylsulfamylbenzoyl, nitrobenzoyl and the like results in compounds having substantially the same activity as those specifically claimed herein.

Again, replacement of group R² by substituted aryloxy groups results in substituted compounds having substantially the same properties as those specifically claimed herein.

Replacement of substituent R³ by an alkylamino, alkoxy, mercapto, or dialkylamino group having up to eight carbon atoms therein does not deleteriously affect the activity of the resulting compounds.

Processwise, the invention resides principally in a process wherein a compound of the formula:

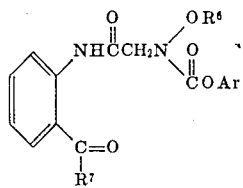

where R⁷ is phenyl or lower alkyl having one to five carbon atoms, or lower alkoxy having one to five carbon atoms. wherein R⁶ is carbethoxy, acyl or benzoyl and Ar is preferably phenyl is heated in alcohol with excess base followed by acidification of the cooled solution with an acid to form a compound of the formula:

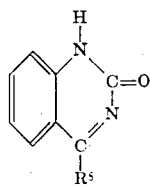

where R⁸ is phenyl, lower alkyl having one to five carbon atoms or represents an oxygen atom in which case the carbon to nitrogen bond in the 3 to 4 positions is saturated. It will be obvious to those skilled in the art that the benzene ring in the above formulae can have one of its hydrogens substituted by a chlorine atom or by one of the other aforementioned substituents. The presence of such substituents does not deleteriously affect the properties of the compounds so substituted.

The following examples serve to illustrate details of the invention.

EXAMPLE 1

2-[carboxy(hydroxy)amino]-2'-benzoyl-4'-chloroacetanilide, phenyl ester

A mixture of 4.0 g. of 2'-benzoyl-4'-chloro-2-hydroxyamino-acetanilide, 10 ml. of phenylchloroformate and 100 ml. of chloroform was refluxed for 30 minutes. The solvent was removed in vacuo and the residue precipitated with 60 ml. of ethanol and then recrystallized from acetonitrile.

Elemental analysis confirmed the empirical formula:

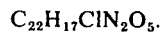

$C_{22}H_{17}ClN_2O_5$.

EXAMPLE 2

5-[2-Benzoyl-4-chlorophenyl]-3-hydroxy hydantoic acid

To a suspension of 4.4 g. of 2'-benzoyl-4'-chloro-2-hydroxyamino-acetanilide, phenyl ester in 60 ml. of ethanol was added 20 ml. of 4 N sodium hydroxide and the reaction mixture was gently warmed on the steam bath forming the orange colored sodium salt. The reaction mixture was acidified with 60 ml. of 4 N hydrochloric acid, heated for 5 minutes, diluted with water and cooled. The precipitate was filtered and washed with chloroform giving 1.4 g. of product, m.p. 153°–155° C.

Elemental analysis confirmed the empirical formula:

$C_{16}H_{13}ClN_2O_5$.

EXAMPLE 3

2-[Carboxy(hydroxy)amino]-2'-benzoyl-4'-chloroacetanilide, acetate, phenyl ester A solution of 2.0 g. of 2-[carboxy(hydroxy)amino]-2'-benzoyl-4'-chloroacetanilide, phenyl ester and 25 ml. of acetic anhydride was warmed on the steam bath for 20 minutes. The solvent was removed in vacuo and the residue recrystallized from isopropanol giving 1.0 g. of product, m.p. 127°–129° C.

Elemental analysis confirmed the empirical formula:

$C_{24}H_{19}ClN_2O_6$.

EXAMPLE 4

2-[Carboxy(hydroxy)amino]-4'-chloroacetanilide, phenyl ester was prepared from 5.0 g. of 4'-chloro-2-hydroxyaminoacetanilide and 7.0 ml. of phenylchloroformate according to the procedure of Ex. 1. The pure compound, m.p. 209°–211° C, was obtained from recrystallization from isopropanol.

Elemental analysis confirmed the empirical formula:

$C_{15}H_{13}ClN_2O_4$.

EXAMPLE 5

5-(p-chlorophenyl)-3-hydroxyhydantoic acid was prepared from 10.0 g. of 2-[carboxy(hydroxy)amino]-4'-chloroacetanilide, phenyl ester and sodium hydroxide according to the procedure of Ex. 2. The compound, m.p. 160°–162° C, was obtained pure after recrystallization from ethanol.

Elemental analysis confirmed the empirical formula:

$C_9H_9ClN_2O_4$.

EXAMPLE 6

2-[Carboxy(hydroxy)amino]-4'-chloroacetanilide, phenyl ester, acetate was prepared from 6.6g. of 2-[carboxy(hydroxy)amino]-4'-chloroacetanilide, phenyl ester and 35 ml. of acetic anhydride according to the procedure of Ex. 3. The solid, 5.4 g., m.p. 148°–151° C. which precipitated out of the reaction mixture was collected and washed with hexane.

EXAMPLE 14

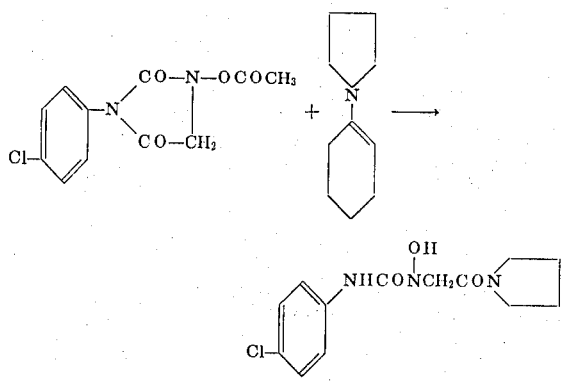

3-(p-chlorophenyl)-1-hydroxy-1-(1-pyrrolidinylcarbonylmethyl)-urea

To a solution of 4.0 g. of 3-(p-chlorophenyl)-1hydroxyhydantoin, acetate in 100 ml. of dimethoxyethane warmed to 50° was added dropwise a solution of 4.5 g. of 1-(N-pyrrolidine)-1-cyclohexene in 50 ml. of dimethoxyethane. The solution was stirred at 50° C for 20 minutes, let stand overnight, and the solvent removed in vacuo. After several recrystallizations from isopropanol the product had a m.p. of 181°–183° C.

Elemental analysis confirmed the empirical formula:

$C_{13}H_{10}ClN_3O_3$.

The compounds of the present invention can be prepared and administered in a wide variety of oral and parenteral dosage forms, singly, or, in combination with other coating compounds. They can if desired be associated with a carrier which can be a solid material or a liquid in which the compound is dissolved, dispersed, or suspended. The solid compositions can take the form of tablets, powders, capsules, pills, or the like, preferably in unit dosage forms for simple administration or precise dosages. The liquid composition can take the form of solutions, emulsions, suspensions, syrups, or elixirs. Such conventional solid carriers as sucrose, starches, etc., or liquid vehicles such as nontoxic alcohols, glycerine, or the like, thus may be used.

What is claimed is:

1. The process which comprises treating by heating in alcohol with sodium hydroxide or ammonium hydroxide a compound of the formula

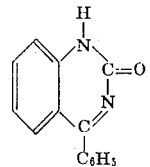

acidifying the reaction mass and recovering a ring closed compound of the formula:

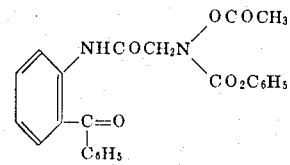

* * * * *

PO-1050
(5/69)

UNITED STATES PATENT OFFICE
CERTIFICATE OF CORRECTION

Patent No. 3,761,476         Dated September 25, 1973

Inventor(s) Stanley C. Bell and George L. Conklin

It is certified that error appears in the above-identified patent and that said Letters Patent are hereby corrected as shown below:

In column 10 after line 14 the formula should be:

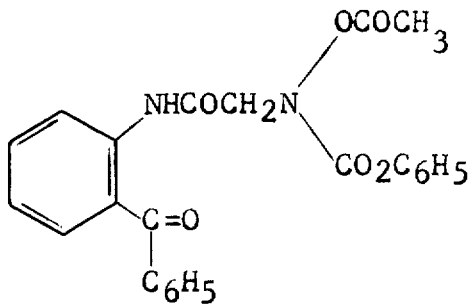

In column 10 after line 24 the formula should be:

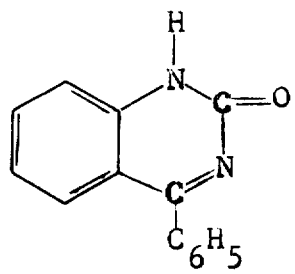

Signed and sealed this 2nd day of April 1974.

(SEAL)
Attest:

EDWARD M. FLETCHER, JR.
Attesting Officer

C. MARSHALL DANN
Commissioner of Patents